Dec. 17, 1929.  E. LATSHAW  1,740,358
ARTICULATED CAR
Filed Oct. 4, 1928
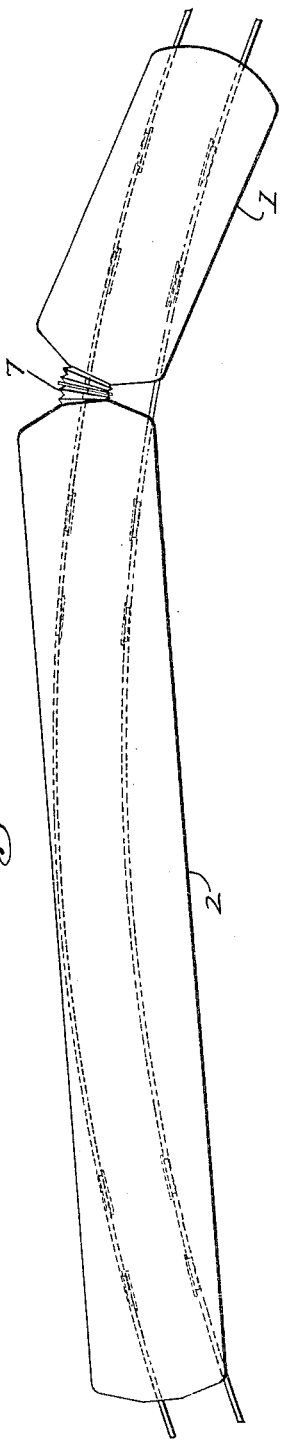
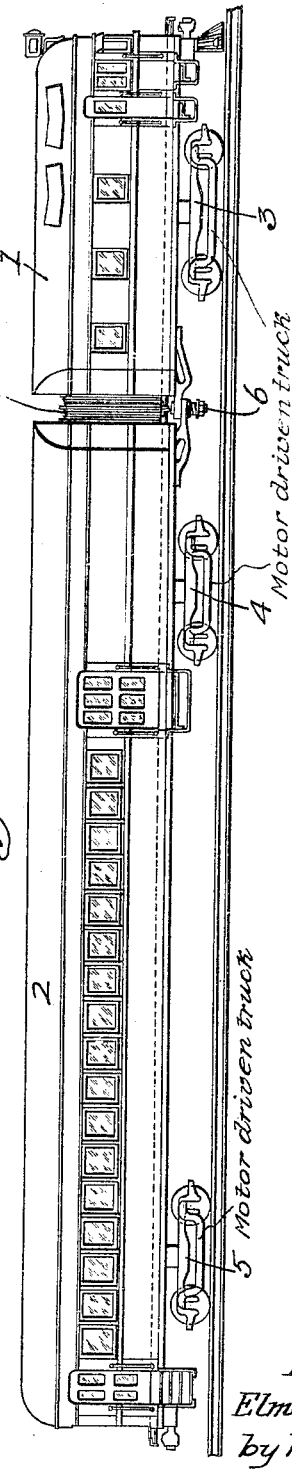
Inventor:
Elmer Latshaw,
by his Attorneys,
Howson & Howson Patented Dec. 17, 1929

1,740,358

UNITED STATES PATENT OFFICE

ELMER LATSHAW, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA

ARTICULATED CAR

Application filed October 4, 1928. Serial No. 310,330.

An object of the invention is to arrange the power equipment of an articulated car in a forward short section and to arrange the load on a rearward section of substantially standard length.

Another object is to arrange an articulated car having a forward short section on a single truck and a rearward section of substantially standard length having a plurality of trucks.

Another object is to produce an articulated car having a forward short section containing all the power equipment and controls, and a rearward section of substantially standard length, having no equipment except standard air apparatus and motors fed entirely from the forward power unit.

Another object of the invention is to devise an articulated car in which the weight of the car may be increased to one having six axles, without employing 6-wheel motor trucks.

Another object is to increase the power of an articulated car without materially increasing the weight thereof.

Another object is to produce an articulated car having a forward short section and a rearward section of substantially standard length.

Another object is to produce an articulated car of pleasing design.

Other objects will appear hereinafter.

In the drawings, which illustrate one form of the invention,

Fig. 1 is a plan view; and

Fig. 2 is a side elevation thereof.

At 1 is shown the forward short section, and at 2 is illustrated the rearward section of substantially standard length. The forward section 1 is provided with a single two-axle truck 3, while the section 2 has two such trucks indicated by the reference numerals 4 and 5. The two sections are shown as connected by the king bolt 6 and accordion-plaited vestibule cover 7.

All of the power plant apparatus, control equipment, gas tanks, etc., will be placed on the forward short section, while the only apparatus carried by the rearward section will be the standard air equipment and motors controlled entirely from the front power unit. Jumpers between the sections connect the motor leads on the passenger car to the power unit. Standard air couplings and a jumper for the electric lighting also connect the two sections.

By this arrangement, the weight of the train may be increased to that of one having 6-axles without the necessity of employing 6-wheel motor trucks. A considerable advance in the art is accomplished by this structure, inasmuch as it is not likely that more than two motors can be mounted on a 6-wheel truck, and a 6-wheel truck is heavier in weight than a 4-wheel truck of the same capacity. With suitable power plants and motors, the greatest possible tractive effect can be obtained by mounting motors on all three trucks. It is to be understood, however, that motors can be placed on any one or pair of trucks of the car without departing from the essential features of the invention.

A further advantage is resident in this structure in that all the power apparatus and control equipment is located in one section which is readily detachable. The power unit is substantially balanced about the front truck and is kept stable by the articulated connection to the rearward section. When desirable, this forward section can be blocked between the underframe and truck; and being uncoupled at the articulated joint, it could be propelled away from the car and coupled to any other type of car, or could be run into the shop for repairs.

With this design, the weight of one truck is saved, and the weight of the car is utilized for tractive effect, although it results in a unit with nearly the flexibility and utility of a locomotive.

It is intended that the forward end be built with an exterior finish similar to the rearward section. However, the underframe, sills and bolster are designed to accommodate the power equipment to be installed. Much of the equipment ordinarily mounted under the gas cars is, in the present instance mounted inside the power unit cab, inasmuch as the underframe of the forward end is too small to accommodate all. The gas and air tanks may be located under the power unit but it is intended that all other equipment be placed in the cab where it is accessible and protected.

The castings of the articulated coupling are attached rigidly to the center sills and are of sufficient strength to resist the buffing which occurs, and also to stabilize the forward power unit. When installing this type of car on a line, the railroad company can purchase three or more types of cars, such for instance, passenger; baggage; passenger, baggage, and mail; and a single power unit, the power unit being coupled up to whichever car is needed for a particular run.

It is readily understood that the invention is susceptible to numerous modifications, and it is intended that it be limited only by the scope of the appended claims.

I claim:

1. In an articulated car, a short section carrying substantially all the power equipment and having a single, motor driven truck, and another section of substantially standard length carrying substantially all the load and having a plurality of trucks at least one of which is motor driven.

2. In an articulated car, a forward short section having a single truck therebeneath and carrying substantially all the power equipment, and a rearward section of substantially standard length carrying substantially all the load, and having a plurality of motor driven trucks, the motors of which are connected with the forward power unit.

3. In an articulated car, a short section supported on a single pivotal truck with one end of the short section attached directly to a car of substantial standard length.

4. In an articulated car, a short section supported on a single pivotal truck with one end of the short section attached directly to a car of substantial length having a plurality of trucks.

5. In an articulated car, a short section and a long section, a pivotal connection between adjacent ends of the sections lying between the sections, a single pivotal truck supporting the short section, and a truck support for the long section.

6. In an articulated car, a short section and a long section, a pivotal connection between adjacent ends of the sections lying between the sections, a single pivotal truck supporting the short section, and a truck support for the long section, the short section containing substantially all the power equipment, the long section supporting substantially all the load.

ELMER LATSHAW.